Figure 1:
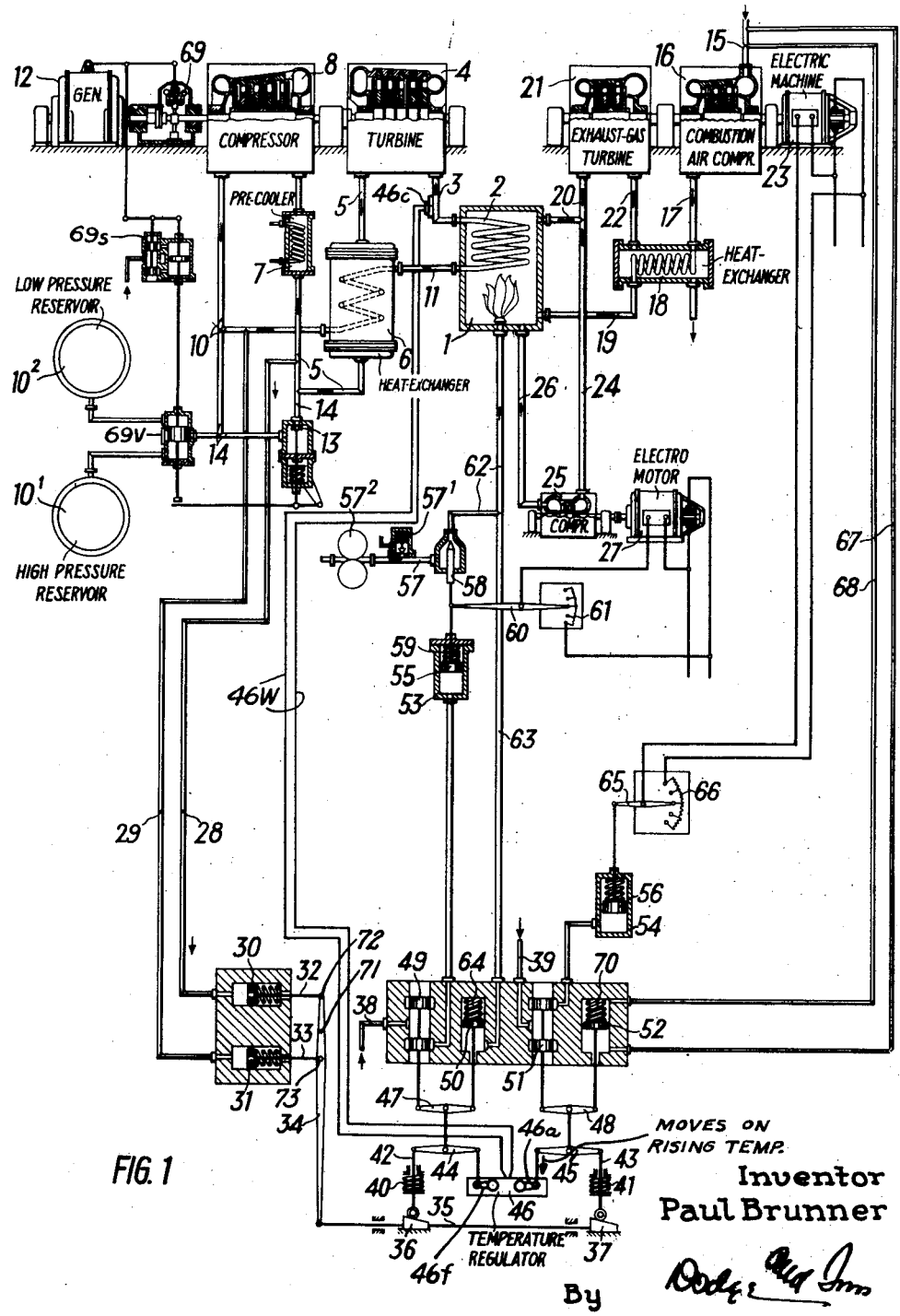

July 14, 1953 P. BRUNNER 2,645,083
HEAT SUPPLY REGULATION OF THERMAL POWER PLANTS
Filed Oct. 24, 1949 2 Sheets-Sheet 1

Inventor
Paul Brunner

By [signature]
Attorneys

Inventor
Paul Brunner
By
Attorneys

Patented July 14, 1953

2,645,083

UNITED STATES PATENT OFFICE 2,645,083

HEAT SUPPLY REGULATION OF THERMAL POWER PLANTS

Paul Brunner, Zurich, Switzerland, assignor to Aktiengesellschaft Fuer Technische Studien, Zurich, Switzerland, a corporation of Switzerland Application October 24, 1949, Serial No. 123,203
In Switzerland November 4, 1948

11 Claims. (Cl. 60—49)

1

The invention relates to a method of regulating the heat supply in a thermal power plant in which a gaseous working medium describes a circuit leading through at least one compressor and at least one turbine and heat is to be supplied to this working medium from the outside in at least one heater. The invention further concerns a thermal power plant for carrying out this method.

It is known that the useful power produced in thermal power plants of this type can be regulated by raising or lowering the pressure level in the circuit, by varying a by-pass flow connecting two points at different pressure in the circuit (by-pass regulation), or by throttling the working medium describing the circuit. In all such methods of regulating the useful power produced, it is necessary, in addition, for the quantity of heat supplied to the working medium from the outside, that is to say in the heater, to be regulated. In cases where the useful power produced is only regulated by variation of the pressure level in the working circuit, it is known to employ for regulating the heat to be supplied from the outside the pressure at any desired point of the circuit, that is to say, a pressure varying approximately in proportion with the power given up externally, this being done in such a manner that the said pressure determines the given value of the quantity of heat to be supplied. It is also known to connect operatively means influencing the working of the firing at the point at which heat is to be supplied from the outside, to a speed governor for regulating the output of the working medium circuit, the governing factor (stroke) of the said speed governor being a measure of the quantity of heat to be supplied in each case.

However, if the useful power produced is regulated by throttling or variation of a by-pass flow between two points at different pressure in the circuit of the working medium, a pressure at any desired point of the circuit does not provide a perfectly clear measure of the quantity of heat to be supplied to the working medium from the outside. Similarly, if the working medium is intermediately heated one or more times the momentary position of the speed governor only provides a measure of the total quantity of heat to be supplied, but not a measure for the distribution thereof to the various heaters in the plant.

The object of the invention is to provide a method and a thermal power plant by means of which, even when a by-pass regulation or throttle regulation or both are provided in addition to a regulation for varying the pressure level in the working medium circuit, the quantity of heat

2 which has to be supplied to the working medium from the outside is automatically correctly determined and, if a number of heaters are present, is also correctly distributed to these heaters. The invention is based upon the fact that there corresponds to each position of a regulating member determining the magnitude of the by-pass flow, for instance of a throttling member, a definite pressure distribution in the circuit, as also a definite output of useful power and consequently a definite quantity of heat to be supplied from the outside. The pressure distribution in the circuit thus provides a perfectly clear measure of the quantity of heat to be supplied from the outside. Consequently, in accordance with the invention, from the pressure drop occurring in the plant for the purpose of producing the power required in each case, at least two pressures prevailing at different points of the circuit path are chosen to control in co-operation with one another both the quantity of fuel supplied per unit of time and the quantity of combustion air supplied per unit of time. In a thermal power plant according to the invention for carrying out the aforesaid method, at least two pressures prevailing at different points of the circuit path of the circulating working medium then act on means which are operatively connected to a control member regulating the fuel supply and to an arrangement regulating the combustion air supply.

Preferably, the quantity of fuel supplied and the quantity of combustion air supplied are regulated in dependence upon the upper pressure of the complete pressure drop and upon the pressure at a point lying at least beyond the first expansion stage, it being possible for the pressures in question to influence the regulation, for example, in linear combination.

If re-heating of the partially expanded working medium takes place, three pressures prevailing at differen points of the circuit path of the working medium may regulate in co-operation with one another the quantities of fuel and combustion air supplied to the various heaters.

Figure 2:
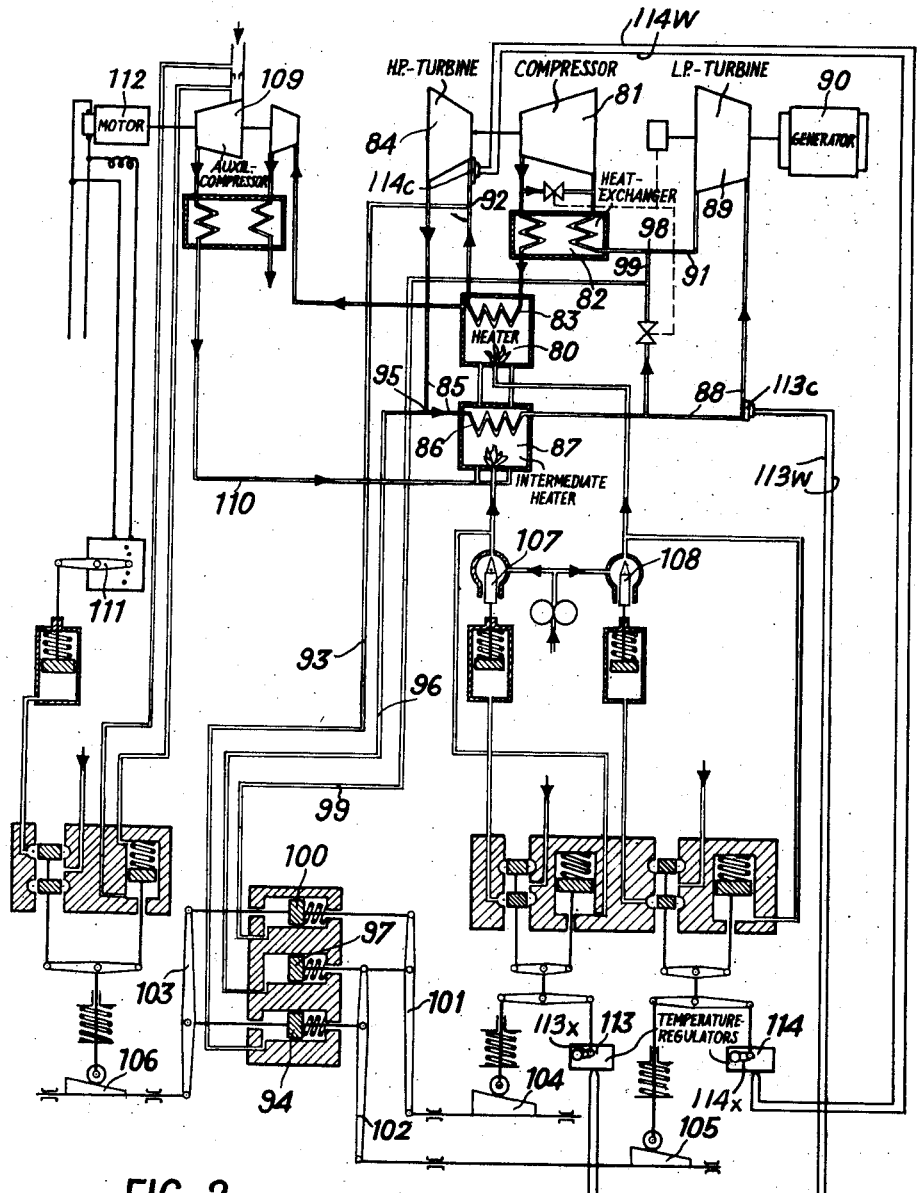

Two constructional forms of plants for carrying out the new method are illustrated in simplified form in the accompanying drawing, in which:

Figure 1 shows a plant with single heating and expansion of the circulating working medium, and Figure 2 shows a plant with double heating and expansion of the working medium.

In Figure 1, 1 is the air heater of a thermal power plant, in which air is employed as working medium. The air flowing through a heating system 2 arranged in the heater 1 passes, after having been heated, through a pipe 3 into a turbine 4, in which it is expanded while giving up energy externally. From this turbine 4, the air then passes through a pipe 5 into a heat exchanger 6 and from there through a pre-cooler 7 to a compressor 8. The air again brought to higher pressure in the compressor 8 flows back through a pipe 10 the heat exchanger 6 and a pipe 11 to the heating system 2 of the air heater 1. The working medium, that is to say air, thus describes a closed circuit. The turbine 4 drives the compressor 8 and a consumer of useful output 12 constructed as a generator. A valve 13 controls a by-pass 14 connecting a point of higher pressure in the working medium circuit (pipe 10) to a point of lower pressure in the working medium circuit (pipe 5).

The quantity of heat to be supplied from the outside to the circulating working medium in the air heater 1 is given up under pressure. The quantity of combustion air required is sucked by a compressor 16 through a measuring nozzle 15 and is conveyed through a pipe 17, a heat exchanger 18 and a pipe 19 into the combustion chamber of the air heater 1. Part of the exhaust gases flowing from the said heater 1 passes through a pipe 20 to an exhaust-gas turbine 21, then through a pipe 22 into the heat exchanger 18 and from there to the atmosphere. The charging group formed by the exhaust-gas turbine 21 and the compressor 16 is coupled with an electric machine 23, with the aid of which the plant is set in operation and which during operation, can make up any deficiency in energy or take up any surplus energy for further transmission.

The remaining part of the exhaust gases from the heater 1 serves to keep down the temperature of the combustion chamber in the said heater and passes through a pipe 24 into a compressor 25 and from there through a pipe 26 and back into the heater 1. The compressor 25 is driven at variable speed by an electric motor 27.

The circuit pressures prevailing in the two pipes 5 and 10 act through pipes 28 and 29 on impulse pistons 30 and 31 respectively. Rods 32 and 33 respectively rigidly connected to the said pistons are linked to a lever 34, which is arranged to displace a rod 35 comprising two cam paths 36 and 37 from, for example, a "no-load position" to an "overload position." 38 and 39 are two pipes through which a pressure medium, for example oil, can be fed from a source not shown. The cam paths 36 and 37 determine the position of push rods 42 and 43 forced against them by springs 40 and 41 respectively. Two-armed levers 44 and 45 are influenced on the one hand by the push rods 42 and 43 respectively and on the other hand by a temperature controlling instrument generally indicated by the numeral 46 applied to the case in which it is enclosed. Various specifically different controllers in which a regulatory member is moved proportionately to temperature at some remote point might be used but applicant contemplates using a controller manufactured by Leeds and Northrup Company of Philadelphia, Pa. and designated by them as the "Micromax Electric Controller". The general scheme of the system is illustrated in their catalog No. N-00A copyright 1942 on the lower half of pages numbered 6 and 7. A copy of this catalog is in the Scientific Library of the U. S. Patent Office, the shelf number being TK 308 L 54C. On the assumption that the Leeds and Northrup instrument is used, the location of the thermal couple is indicated at 46c. The circuit wires from the couple to the recording controller, control unit and drive mechanism mounted in the case 46, are indicated at 46w. The controller includes two levers, 46f which controls fuel, and 46a which controls combustion air. The arrangement is such that these two levers move downward in response to rising temperature at 46c. Any arrangement which will give proportional response of the levers to temperature could be substituted. The levers 44 and 45 act in turn on levers 47 and 48 respectively. In addition, the lever 47 is engaged on the one hand by a slide valve 49 and on the other hand by the rod of a piston 50, while the lever 48 is engaged on the one hand by a slide valve 51 and on the other hand by the rod of a piston 52. The slide valves 49 and 51 control the supply of pressure oil from the pipes 38 and 39 respectively to the servo-motors 53 and 54, and the discharge of used pressure oil from these two servo-motors. The piston of the servo-motor 53 is designated by the reference numeral 55 and that of the servo-motor 54 by the reference numeral 56.

The servo-motor 53 controls with the aid of its piston 55 the supply of fuel to the combustion chamber of the heater 1. The fuel is supplied by a pump $57^2$ through a pipe 57, provided with an overflow valve $57^1$; and a governing valve 58, whose position is controlled by the servo-motor piston 55 loaded by a spring 59, controls the passage of the fuel from the pipe 57 into the combustion chamber. The servo-motor piston 55 simultaneously controls a circulating quantity of exhaust gas, by reason of the fact that it is arranged to vary the value of a resistance 61 through a lever 60 for the purpose of governing the speed of the electric motor 27 which drives the circulation fan 25. The fuel pressure prevailing in a pipe 62 connecting the governing valve 58 to the heater 1 is a measure of the quantity of fuel injected and is employed to restore the slide valve 49 by acting through a pipe 63 branched off from the pipe 62 on the "measuring piston" 50 loaded by a spring 64, and thus return the slide valve 49 into its mid-position through the lever 47.

The piston 56 of the servo-motor 54 controls the supply of combustion air to the heater 1 by reason of the fact that it is arranged to vary through a lever 65, the value of a variable resistance 66 for controlling the speed of the electric machine 23 of the charging group. The quantity of combustion air flowing in is measured at the nozzle 15 and the pressure difference across this nozzle is transmitted through pipes 67 and 68 to the "measuring piston" 52 loaded by a spring 70; the said "measuring piston" causing the slide valve 51 to be restored into its mid-position.

The plant described operates in the following manner: It will be assumed that the by-pass valve 13 is closed. When the load on the generator 12 increases, the speed of the turbine 4 falls, so that a governor 69 serving to regulate the output of the working medium circuit brings about a rise in the pressure level in the circuit through which the working medium passes. This type of control is the same as that described in the patent to Keller No. 2,172,910 dated Sept. 12, 1939 in which a governor 28 is the analogue of the governor 69 and the reservoirs 17 and 18 are the analogues of the high pressure reservoir 10¹ and the low pressure reservoir 10². In the present construction a servo-motor 69s transmits the indications of the governor 69 to the regulatory valve 69v. The parts just mentioned perform the functions of the valve units 21, 23 and their actuating motors shown in the Keller patent. Thus, this particular detail of regulation is known in the art. In this way the pressures in the pipes 28 and 29 rise in proportion with the increase in pressure in the circuit, so that the pistons 30 and 31 are moved to the right, and in turn move the lever 34 parallel to itself, also to the right. The cam paths 36 and 37 are therefore also moved to the right end thus forcing the push rods 42 and 43 upward. This upward movement is followed by the two slide valves 49 and 51, so that pressure oil can flow away from the servomotor 53, and the governing valve 58 therefore frees a larger area of throughflow. Pressure oil can then flow from the pipe 39 into the servo-motor 54, with the result that the adjustable resistance 66 is so controlled as to be moved in a direction involving an increase in the speed of the electric machine 23 of the charging group. Furthermore, owing to the increased fuel pressure in the pipe 63 the piston 59 is forced upwardly against the spring 64, at the same time restoring the slide valve 49 into its mid-position with the aid of the lever 47, so that the valve 58 controlling the fuel supply comes to rest, but this does not happen until the fuel supply has been adjusted to the required quantity fixed by the cam path 36.

The increased quantity of combustion air sucked in produces a greater pressure drop across the nozzle 15 and consequently a lower pressure in the pipe 68, so that the piston 52 moves upwardly while overcoming the influence of a spring 70 and thus restores the slide valve 51 into its mid-position. The servomotor piston 56, however, does not come to rest until the supply of combustion air has been adjusted to the required quantity fixed by the cam path 37.

In the event of a sudden reduction of the load on the generator 12, the speed of the turbine 4 increases, and the governor 69 serving to regulate the output of the working circuit initiates movements, resulting, firstly in an opening of the by-pass valve 13 and secondly in a flow of working medium withdrawn from the pipe 10 of the circuit into a low pressure storage reservoir 10². The passage of working medium into the low pressure reservoir 10² is again a characteristic function of the regulatory scheme disclosed in Keller 2,172,910. The by-pass valve 13 is spring biased in a closing direction as shown. It has a one-way thrust connection with the rod of the piston valve 69v and is opened when that valves moves to connect the low pressure reservoir 10² with the system, but is unaffected by motion of the valve 69v in a direction to connect the high pressure reservoir 10¹ with the system. As long as only the by-pass valve 13 is opened, the pressure in the pipe 5 increases, while the pressure in the pipe 10 falls. The piston 30 is consequently moved to the right and the piston 31 to the left, so that the lever 34 is rotated in the clockwise direction about a point 71 lying between the two points of articulation 72 and 73 of the rods 32 and 33 respectively. Consequently, the cam paths 36 and 37 are displaced to the left, that is to say in the direction to decrease the quantities of fuel and combustion air supplied.

In the plant described, two pressures, prevailing at different points (pipes 5 and 10) of the expansion path of the circulating working medium and chosen from the pressure drop which is to be dealt with in the plant for the purpose of producing the power required in each case, therefore regulate in cooperation with one another both the quantity of fuel flowing per unit of time through the governing valve 58 and the quantity of combustion air sucked in per unit of time by the compressor 16. Since the same pressure prevails in the pipe 3, apart from the pressure drop caused by the flow as in the pipe 10, it may be stated that the quantity of fuel supplied and the quantity of combustion air supplied are regulated in dependence upon the inlet pressure of the turbine 4 (upper pressure of the complete pressure drop) and upon the pressure at the outlet from this turbine (lower pressure of the complete pressure drop). At the same time, the quantities of fuel and combustion air to be supplied, referred to the movements initiated by the cam paths 36 and 37, are regulated in parallel with one another. Furthermore, the means (pistons 30 and 31) influenced by the pressures in question of the expansion path of the circulating working medium are functionally connected, from the regulation viewpoint, to the arrangement for regulating the output of the working medium circuit.

As has been described, the valve 58 regulating the supply of fuel is restored under the influence of a factor or quantity (pressure in the pipe 63) characterising the quantity of fuel momentarily supplied, and the arrangement (65, 66, 23) regulating the supply of combustion air is restored under the influence of a factor or quantity (the pressure difference set up in the nozzle 15) characterising the quantity of combustion air momentarily supplied.

The pressures of the expansion path of the working medium which come into question preferably act in linear combination on the regulation, that is to say, on the valve 58 governing the fuel supply and on the arrangement 65, 66, 23 governing the supply of combustion air. By "linear combination" in the present connection is meant that a value: $k_1.p_1+k_2.p_2$ regulates the quantities of fuel and combustion air, $p_1$ and $p_2$ designating two pressures of the expansion path and $k_1$ and $k_2$ two constants. These constants are fixed by the conditions at the lever 34, the spring constants of the pistons 30 and 31 and the cross-sectional areas of these pistons.

The temperature regulator 46 shown in Figure 1, which acts additionally both on the governing valve 58 and on the arrangement 65, 66, 23 regulating the supply of combustion air, may be influenced, for example, in dependence upon a final heating temperature of the circulating working medium.

Figure 2 shows how the invention can be carried into effect in the case where re-heating of the partially expanded working medium takes place, that is to say, when the heat supply to the working medium takes place in more than one heater. In this figure, 80 is a first heater, in which heat is to be supplied from the outside through a heating system 83 to that part of a circulatory working medium which comes from a compressor 81 through a heat exchanger 82. That part of the working medium which is heated in this manner then passes into a high-pressure turbine 84, in which it is partially expanded while giving up energy to the compressor 81, whereafter it flows over into the heating system 86 of an intermediate heater 87 through a pipe 85 for the purpose of being reheated. The re-heated part of the working medium passes through a pipe 88 into a low-pressure turbine 89, in which it is expanded to a fixed final pressure while giving up energy to a consumer of useful output constructed as a generator 90. The part of the working medium thus expanded, finally passes through a pipe 91 and by way of the heat exchanger 82 back into the compressor 81, in which it is again brought to a prescribed higher pressure. Combustion air sucked in and compressed by an auxiliary compressor 109 is here conveyed through a pipe 110 into the intermediate heater 87, from which the still unused fresh air flows together with the exhaust gases into the heater 80.

The regulation of the quantities of fuel and combustion air to be supplied to the heaters 80 and 87 here takes place in dependence upon three pressures prevailing at different points of the expansion path of the circulating working medium, which pressures are accordingly made to co-operate in the corresponding manner, as described with reference to the two regulating circuit pressures of the first embodiment. Thus, the circuit pressure prevailing at a point 92 situated immediately before the high-pressure turbine 84, that is to say, at the commencement of the expansion path, acts through a pipe 93 on a spring-loaded measuring piston 94, and the circuit pressure prevailing at a point 95 situated in the expansion path of the working medium between the two turbines 84 and 89, acts through a pipe 96 on a spring-loaded measuring piston 97, and finally the circuit pressure prevailing at a point 98 situated at the end of the expansion path of the working medium acts through a pipe 99 on a spring-loaded measuring piston 100.

The co-operation of the pressures prevailing at the said three points 92, 95, 98 of the expansion path of the working medium, which is aimed at for the regulation of the quantities of fuel and combustion air flowing to the heaters 80 and 87, is achieved with the aid of a system of three levers 101, 102 and 103. Linked to the lever 101 are the measuring pistons 100 and 97, of which the measuring piston 100 is also linked to the lever 103, while the measuring piston 97 is also linked to the lever 102. The measuring piston 94 is in turn linked both to the lever 102 and to the lever 103. The lever 101 determines the position of a cam path 104, from which a valve 107 governing the flow of fuel to the heater 87 is adjusted in the manner described with reference to the cam path 36 of Figure 1. Correspondingly, a valve 108 governing the flow of fuel to the heater 80 is adjusted from the cam path 105. Finally, the cam 106 determines, in a manner similar to that described with reference to the cam 37 of Figure 1, the quantity of combustion air conveyed by the auxiliary compressor 109 through the pipe 110 into the heater 87. The parts corresponding to the regulating arrangement 66, 23 of Figure 1 are designated in Figure 2 by the reference numerals 111 and 112 respectively.

For the sake of completeness, it should also be mentioned that 113 and 114 are two temperature regulators which are influenced by different circuit temperatures, and which must act similarly to the temperature regulator 46 of Figure 1 and which may be subject, for example, to the action of the final temperatures to which the working medium is to be brought in the heaters 87, 80. In such case the corresponding couples 113c and 114c are located as shown and are connected by circuit wires 113w and 114w with respective controllers 113 and 114. Such temperature regulators may, however, also be influenced by tube temperatures, temperatures of the walls of the combustion chamber and the like. The moving elements of the controllers are the crank arms 113x and 114x, one for each controller.

As has been described with reference to Figure 2, it is thus possible by applying the invention, even when intermediate heating of the working medium takes place, to achieve the result that the heat to be supplied to the working medium from the outside in accordance with the power produced by the turbines is distributed in the correct degree to the various heaters, or to the various heating systems accommodated in one and the same heater, and of which the one serves for heating a part of the working medium which is at higher pressure and the other one for heating a part of the working medium which is at lower pressure.

The heaters in which heat is to be supplied from the outside to the circulating working medium may be operated with liquid, gaseous or solid fuels. Coal dust, for example may be employed as solid fuel.

What is claimed is:

1. Method for regulating the heat supply in thermal power plants in which at least the greater part of a gaseous working medium describes a closed circuit leading through at least one compressor, consisting of at least one compression stage, and at least one turbine, consisting of at least one expansion stage, and in which heat is supplied to this working medium from the outside in at least one heater by burning fuel with combustion air supplied to said heater, and heat is withdrawn from said working medium in at least one cooler, the course of the combustion air being entirely separated from the circuit described by the working medium; said method consisting in controlling both the supply of fuel and the supply of combustion air to the heater in relation to the combined variation of at least two pressures, which exist at different points in the circuit separated from one another by at least one of said stages, the fuel and air supply being increased by the variation of the highest of said pressures substantially in the same ratio as the heat to be supplied to the working medium increases, if only this highest pressure increases, and the fuel and air supply being decreased by the variation of the lowest of said pressures substantially in the same ratio as the heat to be supplied to the working medium decreases, if only this lowest pressure increases.

2. The method defined in claim 1 which consists in controlling the fuel and air supply in such a manner that it is increased by an amount proportional to the increase of the highest of said pressures, diminished by an amount proportional to the lowest of said pressures, the factor of proportionality being greater for the first named of said amounts than for the second named.

3. Method for regulating the heat supply in thermal power plants in which at least the greater part of a gaseous working medium describes a closed circuit leading through at least one compressor, consisting of at least one compression stage, and at least one turbine, consisting of at least one expansion stage, and in which heat is supplied to this working medium from the outside in at least one heater by burning fuel with combustion air supplied to said heater, and heat is withdrawn from said working medium in at least one cooler, the course of the combustion air being entirely separated from the circuit described by the working medium; said method consisting in controlling both the supply of fuel and the supply of combustion air to the heater in relation to the combined variation of at least two pressures, which exist at different points in the circuit namely a point ahead of the first expansion stage of the turbine and a point beyond said stage, the fuel and air supply being increased by the variation of the higher of said pressures substantially in the same ratio as the heat to be supplied to the working medium increases, if only this higher pressure increases, and the fuel and air supply being decreased by the variation of the lower of said pressures substantially in the same ratio as the heat to be supplied to the working medium decreases, if only this lower pressure increases.

4. Method for regulating the heat supply in thermal power plants in which at least the greater part of a gaseous working medium describes a closed circuit leading through at least one compressor, consisting of at least one compression stage, and at least one turbine, consisting of at least one expansion stage, and in which heat is supplied to this working medium from the outside in at least one heater by burning fuel with combustion air supplied to said heater, and heat is withdrawn from said working medium in at least one cooler, the course of the combustion air being entirely separated from the circuit described by the working medium; said method consisting in controlling both the supply of fuel and the supply of combustion air to the heater in relation to the combined variation of at least two pressures, which exist at different points in the circuit namely a point ahead of the first expansion stage of the turbine and a point behind the last expansion stage of the turbine, the fuel and air supply being increased by the variation of the higher of said pressures substantially in the same ratio as the heat to be supplied to the working medium increases, if only this higher pressure increases, and the fuel and air supply being decreased by the variation of the lower of said pressures substantially in the same ratio as the heat to be supplied to the working medium decreases, if only this lower pressure increases.

5. Method for the working of thermal power plants in which a gaseous working medium continuously described a closed cycle under pressures above atmospheric, consisting in supplying heat to the working medium from an external source of heat, allowing the working medium thus heated to expand in a turbine while doing external work, withdrawing heat from the working medium in a cooler, recompressing the expanded medium in a compressor, effecting an interchange of heat between the expanded and the recompressed parts of the working medium before heat is supplied to the recompressed part from said external source of heat, varying the density of the working medium whilst keeping constant the speeds of the turbine and compressor, and controlling the supply of heat from said external source in relation to the combined variation of at least two pressures, the higher one of which is the pressure at the entrance to the turbine and the lower one of which is the pressure at a point between the turbine and the compressor, the supply of heat being increased as the higher of said pressures increases and decreased as the lower of said pressures increases, whereby an increase of the lower of said pressures produces a smaller decrease of the heat supply than the increase of the heat supply that would be produced by the same increase of the higher of said pressures.

6. Method for regulating the heat supply in thermal power plants in which at least the greater part of a gaseous working medium describes a closed circuit leading through at least one compressor and serially through at least two turbines and in which heat is supplied to working medium flowing from the compressor to the first turbine in a first heater by burning fuel with combustion air supplied to said first heater and heat is supplied to working medium flowing from one turbine to the next turbine in a reheater by burning fuel with combustion air supplied to said reheater, and in which heat is withdrawn from the working medium in at least one cooler, the courses of combustion air in said first heater and reheater being entirely separated from the circuit described by the medium, said method consisting in controlling both the supply of fuel and of combustion air to the first heater and reheater in relation to the combined variation of three pressures, which exist in the circuit at points separated from one another by at least one turbine expansion stage, the fuel and air supply to the first heater being increased as the highest of said pressures increases and decreased as the intermediate one of said pressures increases and the fuel and air supply to the reheater being increased as the intermediate pressure increases and decreased as the lowest pressure increases.

7. The method defined in claim 6 in which, of said three pressures the highest is that at the inlet to the first turbine, the lowest is a pressure between the second turbine and the compressor and the intermediate pressure is the pressure at a point in the circuit between the turbines.

8. Method for the working of a thermal power plant in which a gaseous working medium continuously describes a closed cycle under pressures above atmospheric, consisting in supplying heat to the working medium from a first external source of heat, allowing the working medium thus heated to expand in a turbine, reheating the expanded medium by supplying heat from a second external source, expanding the reheated medium through a second turbine, withdrawing heat from the working medium in at least one cooler, recompressing the expanded medium in a compressor, effecting an interchange of heat between expanded and recompressed parts of the working medium before heat is supplied to the recompressed part from the first named external source of heat, varying the density of the working medium while keeping constant the speeds of at least the first turbine and the compressor, and controlling the rates of supply of heat from the first source and from the second source in relation to the combined variation of at least three pressures, the rate of supply of heat from the first source being increased as the pressure in the circuit at the entrance of the first turbine increases and decreased as the pressure in the circuit intermediate said turbines increases, and the rate of supply of heat from the second source being increased as the pressure in the circuit between said turbines increases and decreased as the pressure in the circuit beyond said second turbine increases.

9. In a thermal power plant, the combination of a closed circuit including at least one compressor in which the working medium is raised to a higher pressure, a heater in which heat is supplied to the compressed working medium, at least one multiple-stage turbine in which the heated medium is expanded, said turbine being connected to drive said compressor, at least one cooler in which heat is withdrawn from the expanded medium, and a consumer of useful output driven by said turbine; motor-operated means for regulating the supply of fuel to said heater; motor-operated means for regulating the supply of combustion air to a combustion room of said heater; two pressure responsive means each movable in response to pressure variations occurring at the corresponding one of two different points in the circuit one ahead of and the other beyond the first turbine stage; motion combining linkage for causing said pressure responsive means conjointly to actuate said fuel regulating means and said combustion air regulating means, the influence of a variation of the lower of said pressures being smaller than and inverse to the influence of the same variation of the higher of said pressures; and two follow-up devices, one responsive to the rate of delivery of fuel to the heater and the other responsive to the rate of delivery of combustion air to the heater and each serving to restore its motor operated regulating means to equilibrium.

10. The combination of the plant defined in claim 9; a motor-driven compressor arranged to return part of the combustion gases issuing from said heater to the combustion space of said heater; means serving to control the speed of said motor-driven compressor; and connections whereby the last named means are actuated by said motor-operated means for regulating the supply of combustion air.

11. In a thermal power plant, the combination of a closed circuit including at least one compressor in which the working medium is raised to a higher pressure, a heater in which heat is supplied to the compressed working medium, at least one turbine in which the heated medium is expanded, said turbine being connected to drive said compressor, at least one cooler for withdrawing heat from the working medium, and a consumer of useful output driven by said turbine; motor-operated means for regulating the supply of fuel to said heater; motor-operated means for regulating the supply of combustion air to said heater; two pressure responsive means each movable in response to pressure variations occurring respectively substantially at the turbine inlet and substantially at the turbine discharge; motion combining linkage for causing said pressure responsive means conjointly to actuate said fuel regulating means and said combustion air regulating means, the influence of a variation of the lower of said pressures being smaller than and inverse to the influence of the same variation of the higher of said pressures; two follow-up devices, one responsive to the rate of delivery of fuel to the heater and the other responsive to the rate of delivery of combustion air to the heater and each serving to restore its motor-operated regulating means to equilibrium; and controlling means responsive to the temperature of the medium immediately beyond said heater and connected through a combining linkage with said two regulating means and their respective follow-up devices whereby control is imposed in response to the temperature attained at the exit of the heater.

PAUL BRUNNER.

References Cited in the file of this patent

UNITED STATES PATENTS

| Number | Name | Date |
| --- | --- | --- |
| 2,095,991 | Lysholm | Oct. 19, 1937 |
| 2,172,910 | Keller | Sept. 12, 1939 |
| 2,319,995 | Keller | May 25, 1943 |
| 2,345,950 | Salzmann | Apr. 6, 1944 |
| 2,432,177 | Sédille | Dec. 9, 1947 |
| 2,441,751 | Broggi | May 18, 1948 |
| 2,454,358 | Traupel | Nov. 23, 1948 |
| 2,494,320 | Traupel | Jan. 10, 1950 |

FOREIGN PATENTS

| Number | Country | Date |
| --- | --- | --- |
| 444,174 | Great Britain | Mar. 13, 1936 |